United States Patent [19]

Sachot

[11] 4,344,220
[45] Aug. 17, 1982

[54] TOOL EXCHANGE APPARATUS FOR BORING MILLS AND METHOD FOR EXCHANGING TOOLS

[75] Inventor: Michel E. Sachot, Orsay, France

[73] Assignee: Societe Hure S.A., Bagneux, France

[21] Appl. No.: 964,174

[22] Filed: Nov. 28, 1978

[30] Foreign Application Priority Data

Nov. 30, 1977 [FR] France ................................ 77 36028

[51] Int. Cl.³ ............................................. B23Q 3/157
[52] U.S. Cl. ...................................... 29/568; 414/736; 414/744 A
[58] Field of Search ................ 29/568, 26 A; 414/736, 414/739, 744 A

[56] References Cited

U.S. PATENT DOCUMENTS

| 3,616,526 | 11/1971 | Tajima | 29/568 |
| 4,012,830 | 3/1977 | Ewertowski | 29/568 |
| 4,156,962 | 6/1979 | Haller | 29/568 |

Primary Examiner—Z. R. Bilinsky
Attorney, Agent, or Firm—Darby & Darby

[57] ABSTRACT

An improved tool exchange apparatus for milling machines with sliding carriages comprising a magazine and a pincer-arm for conveyance.

The magazine is disposed so that the tools are presented with horizontal axis at an exchange station, the pincer-arm is rotatably mounted on one of the horizontal axes of a crank having two parallel horizontal axes. The crank itself is rotatably and slidably mounted along the other horizontal axis to a rotary head which is rotatable about a vertical axis which is fixed relative to the magazine.

15 Claims, 39 Drawing Figures

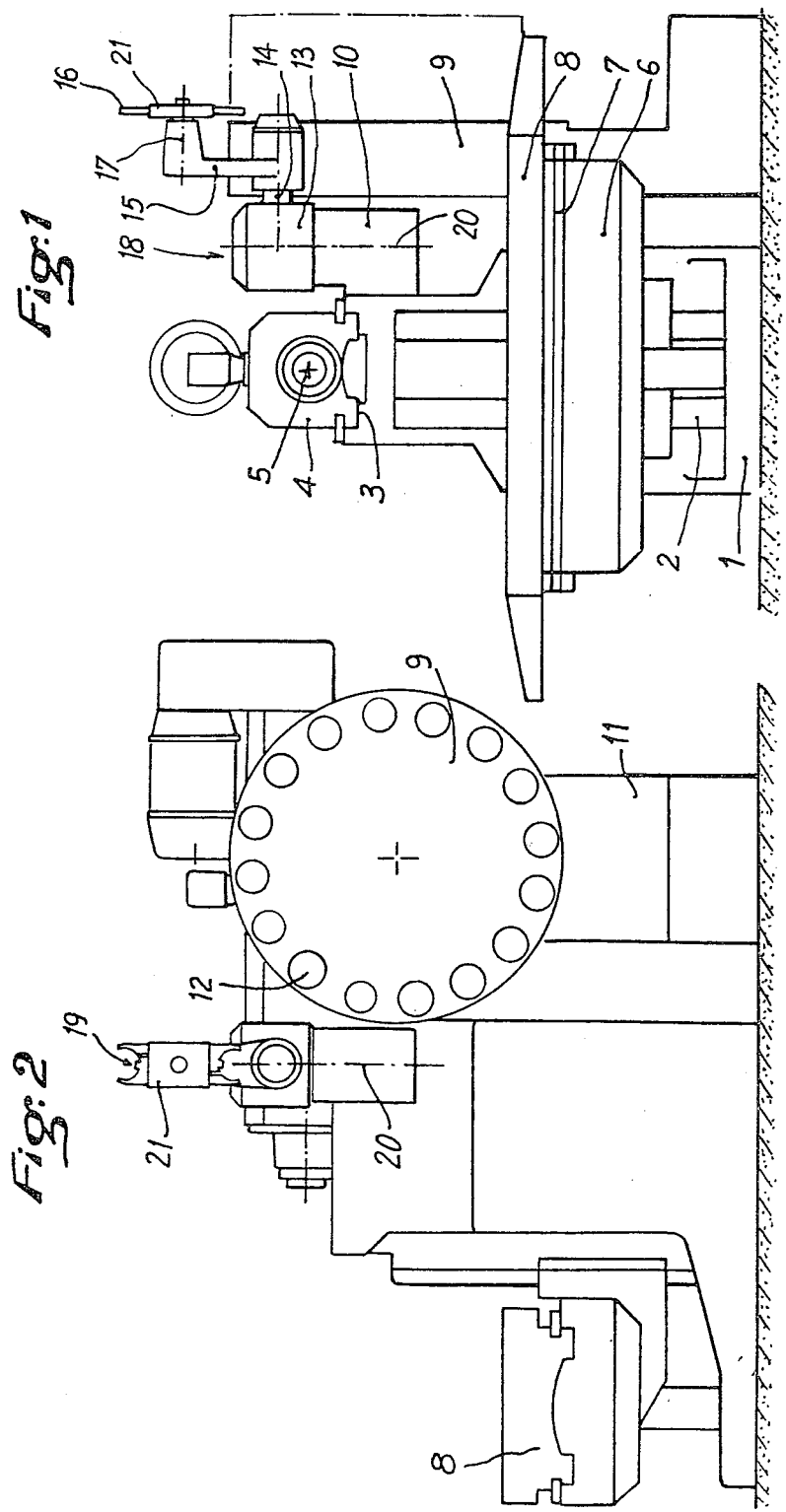

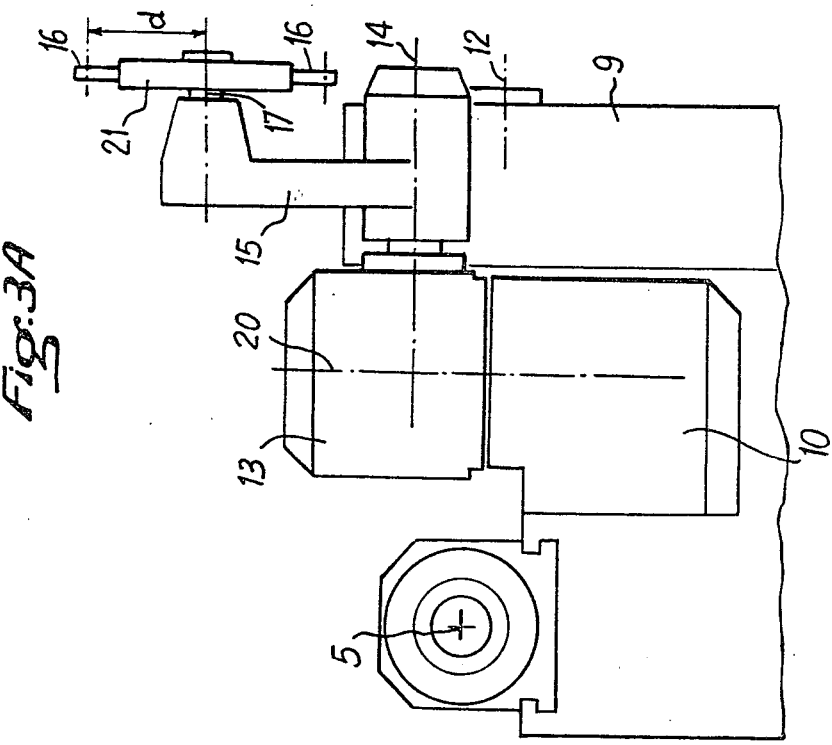
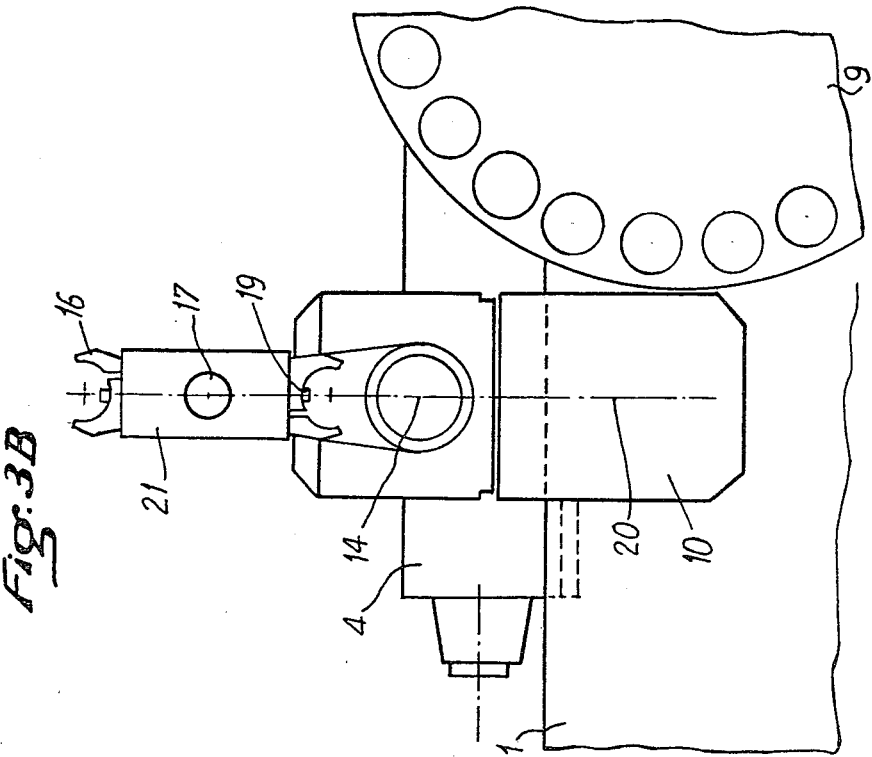

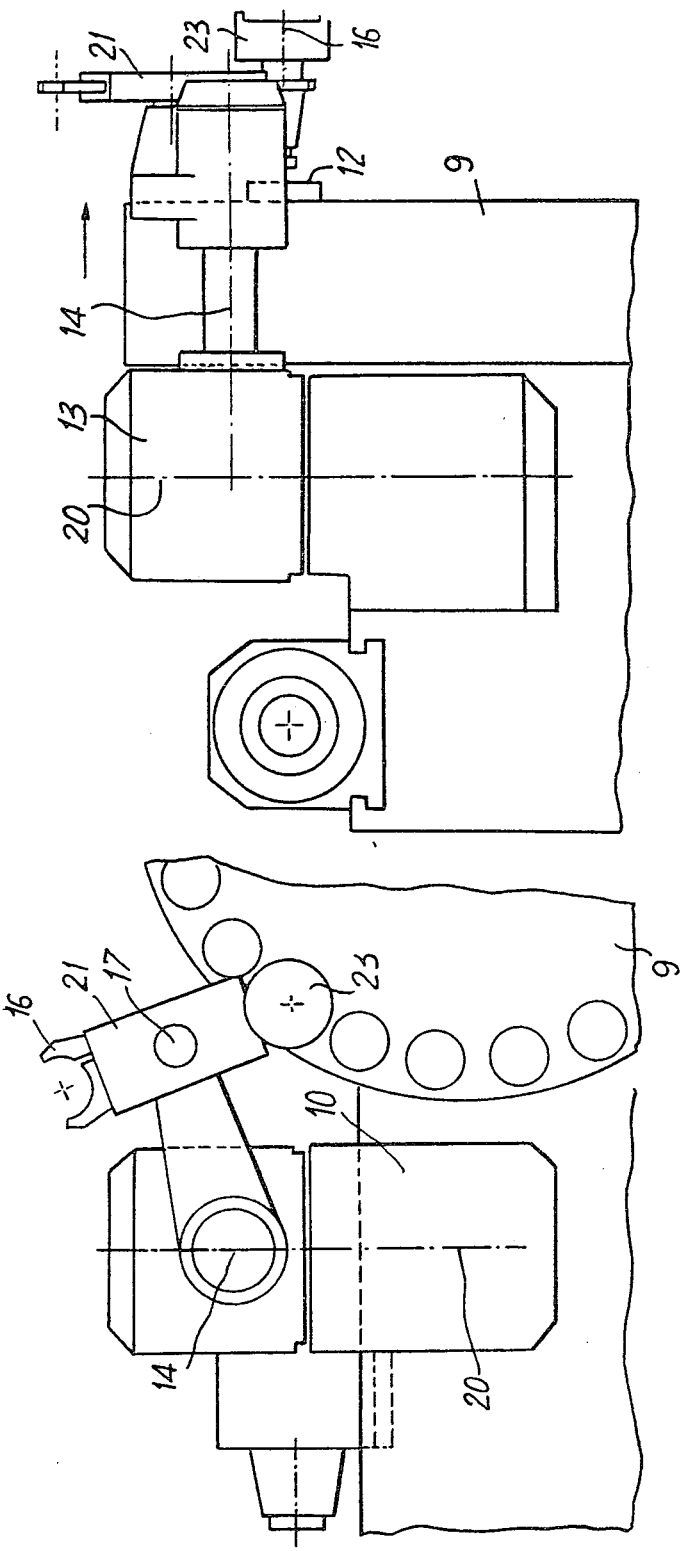

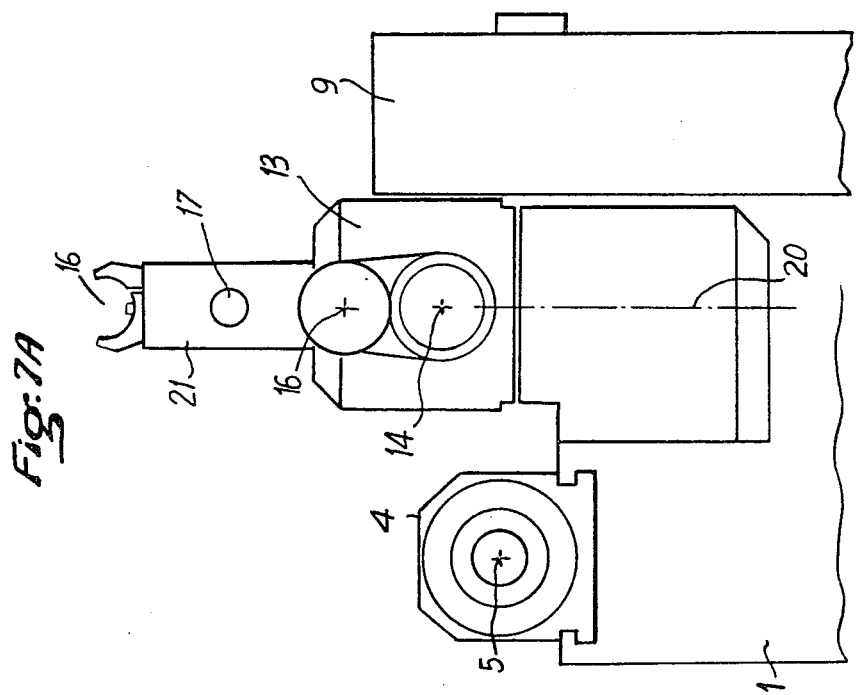
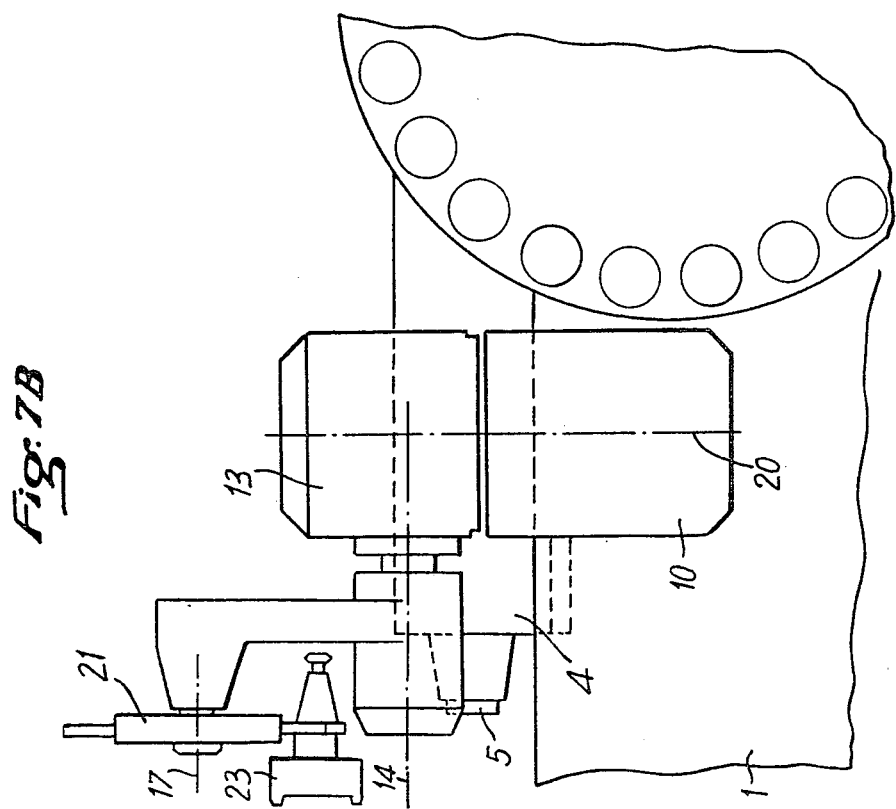

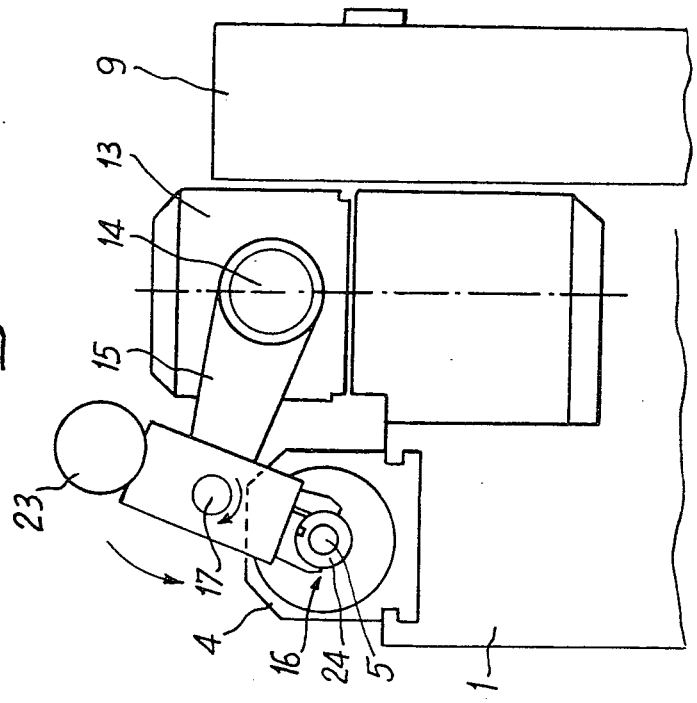
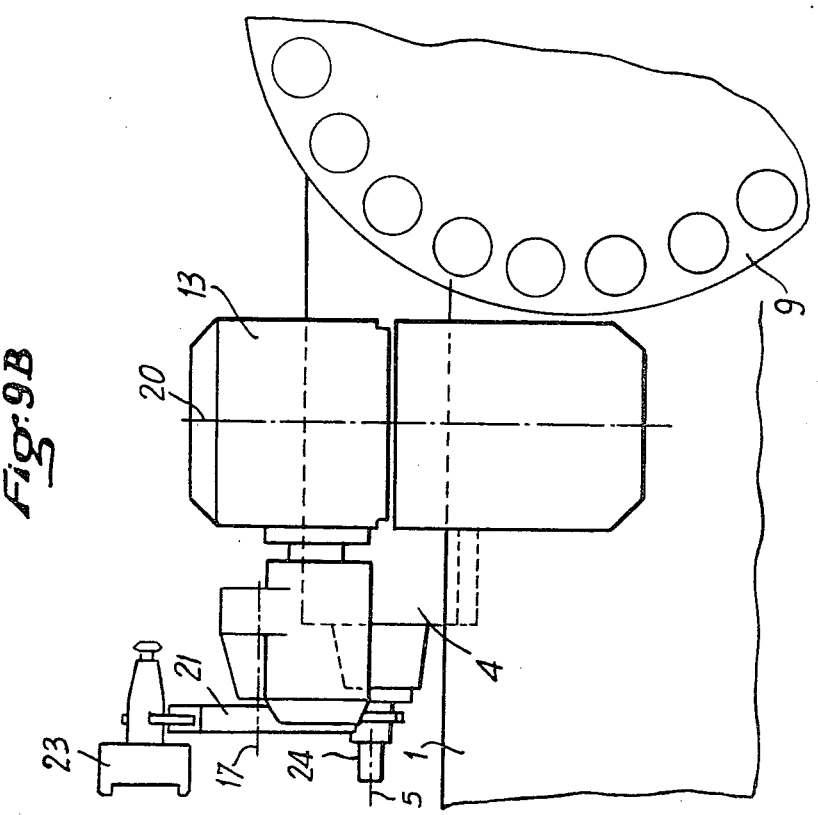

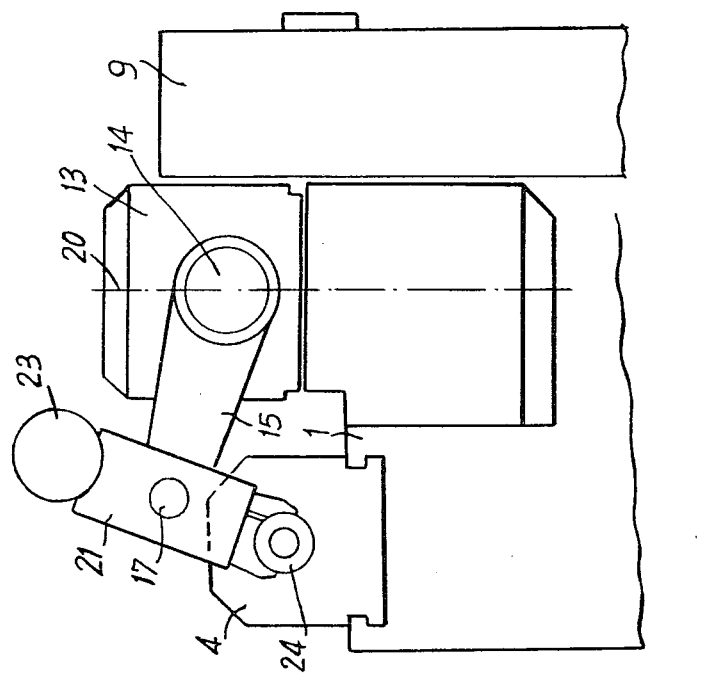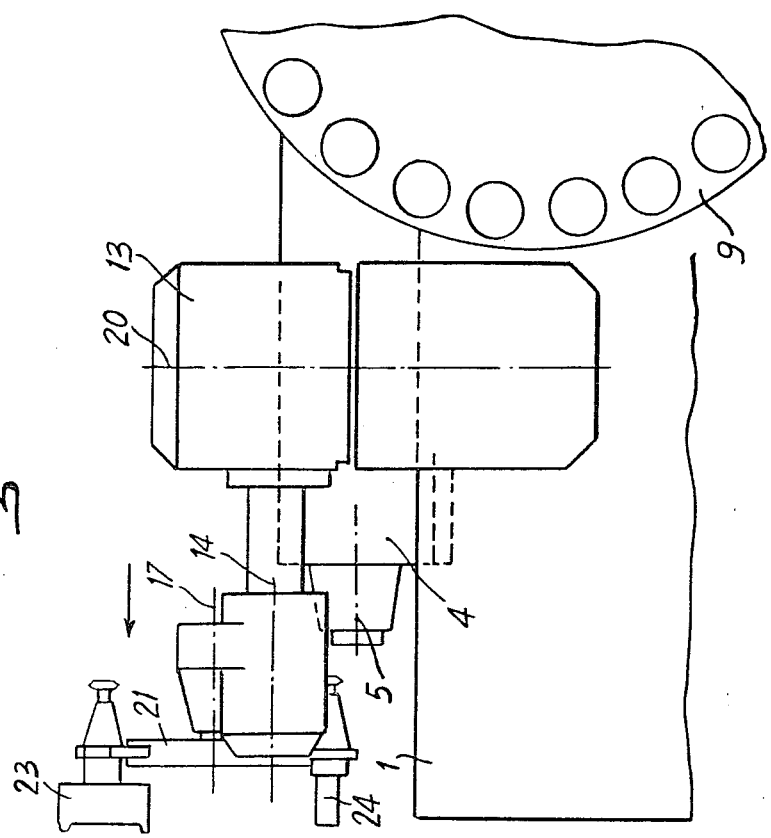

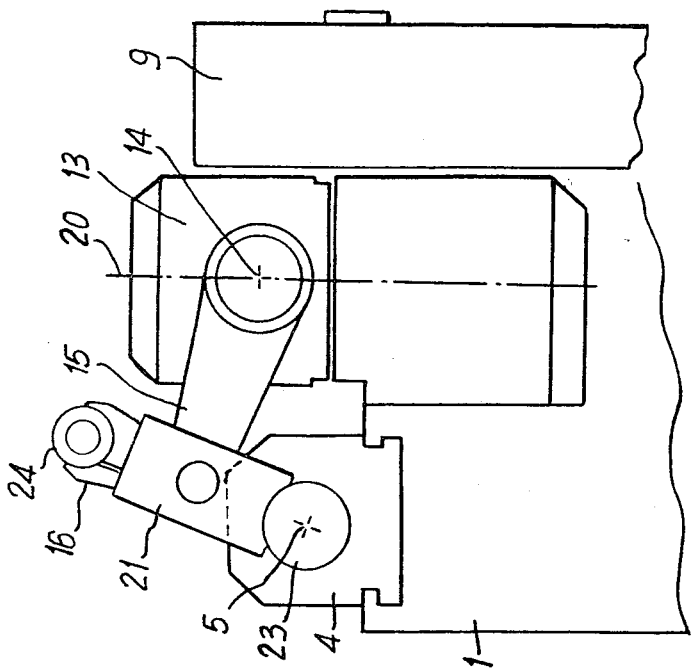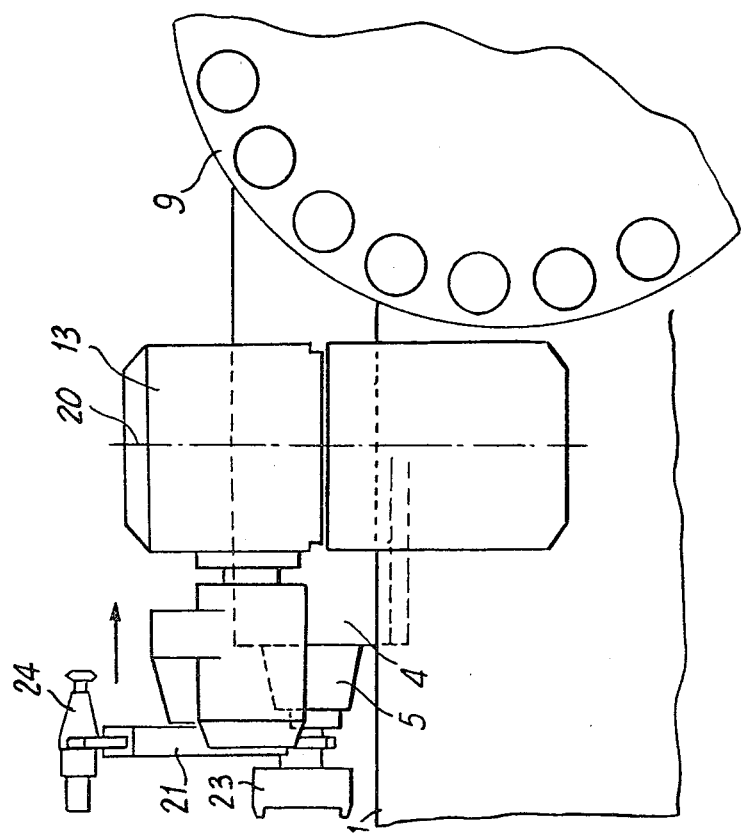

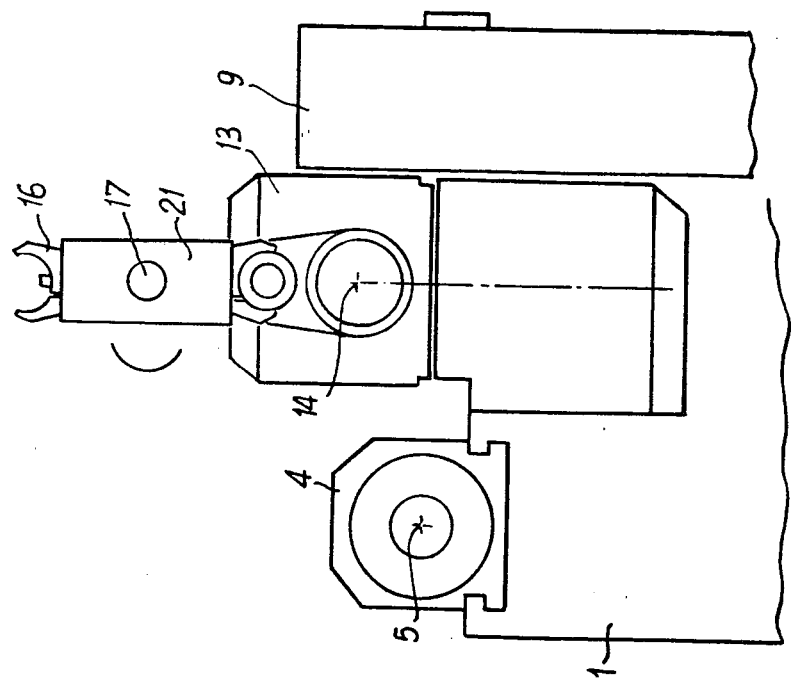
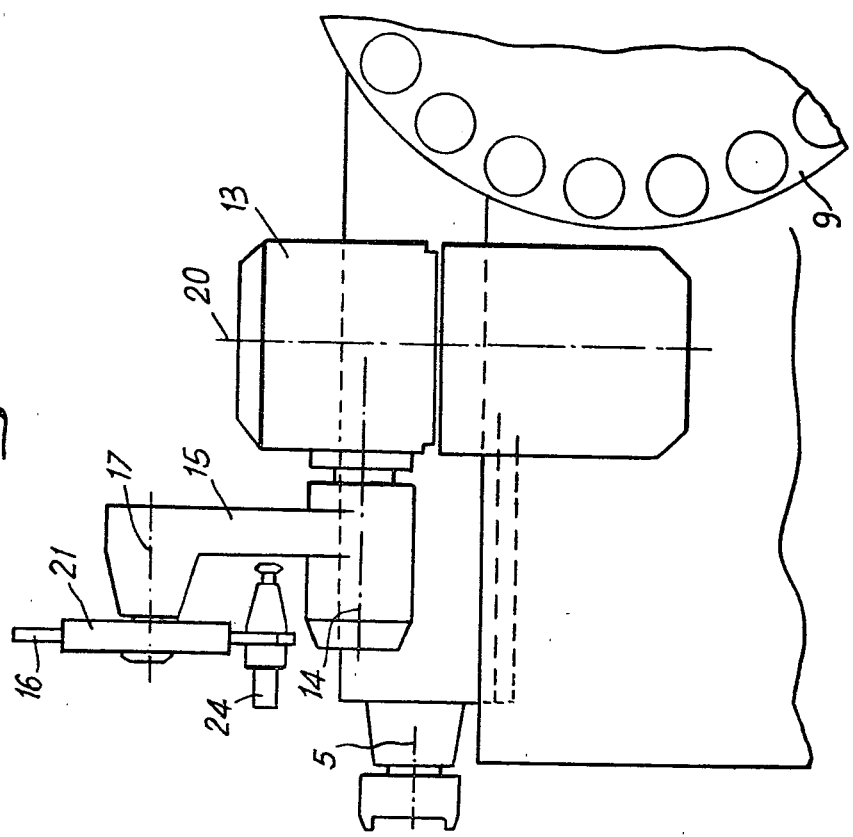

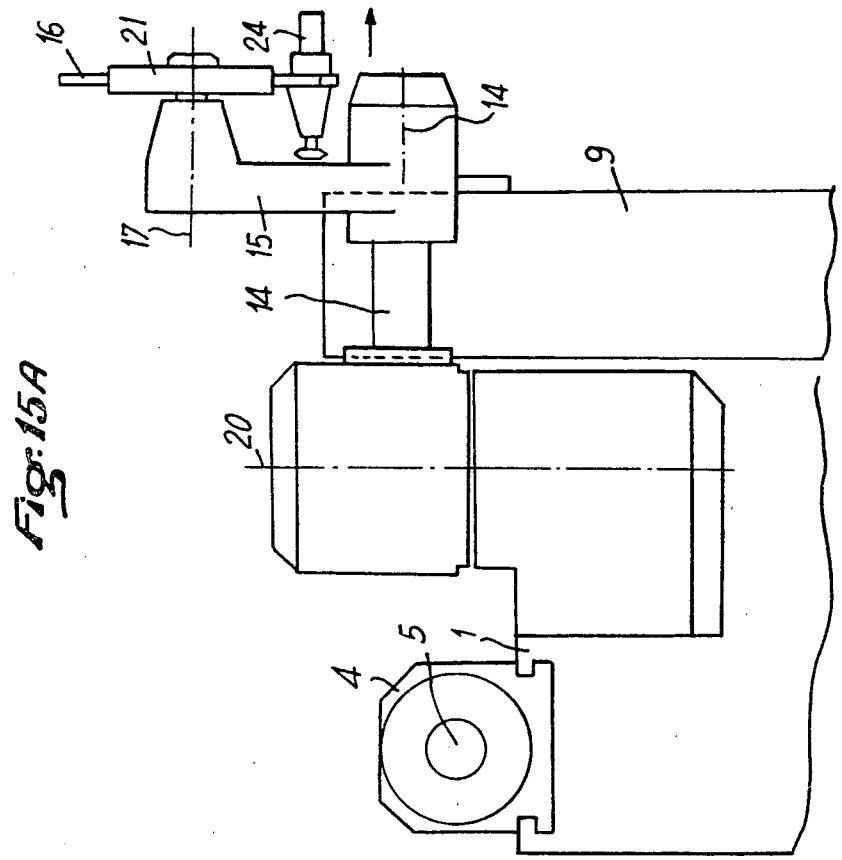
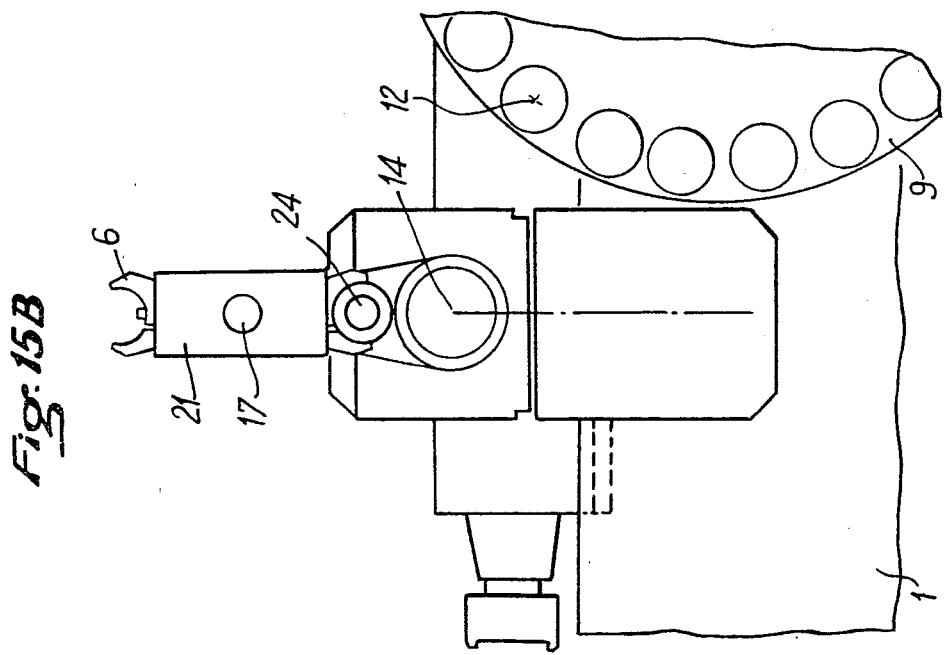
Fig.15A
Fig.15B

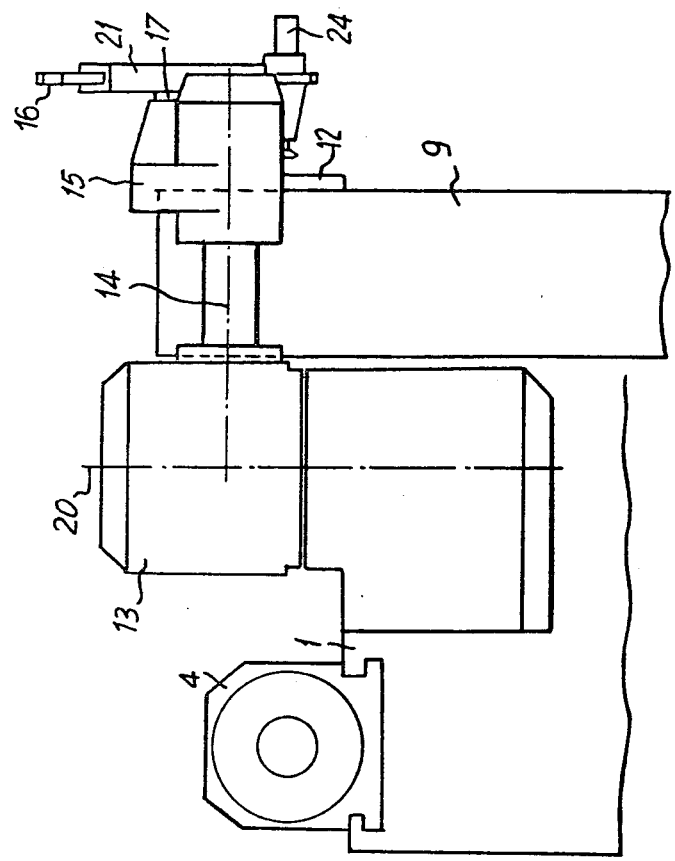
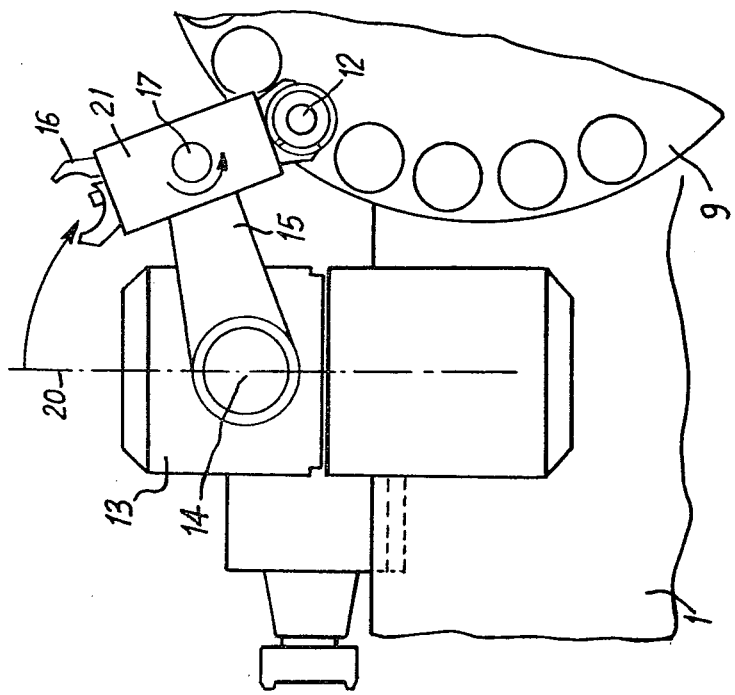
Fig. 16A
Fig. 16B

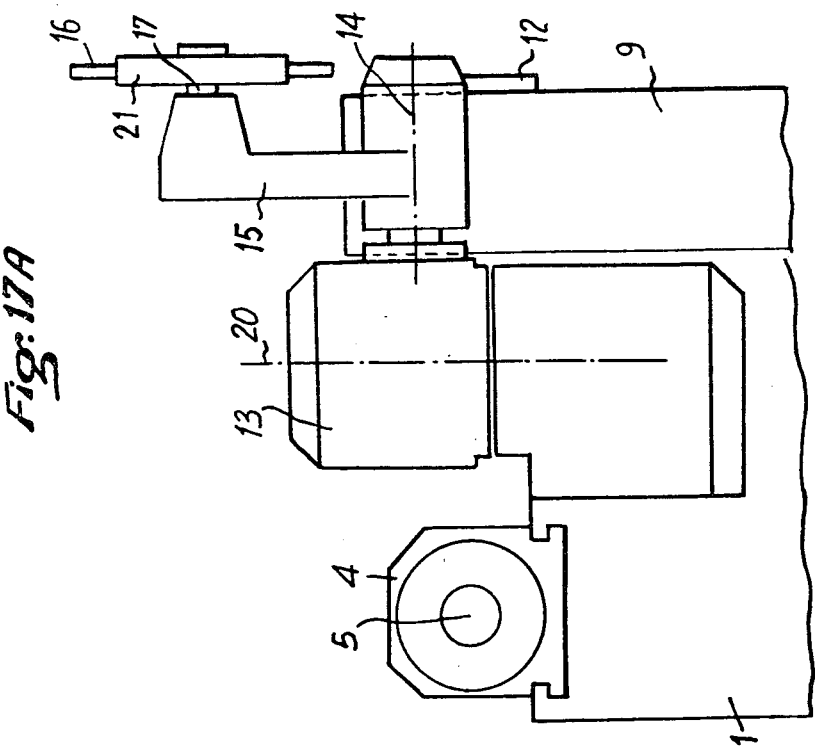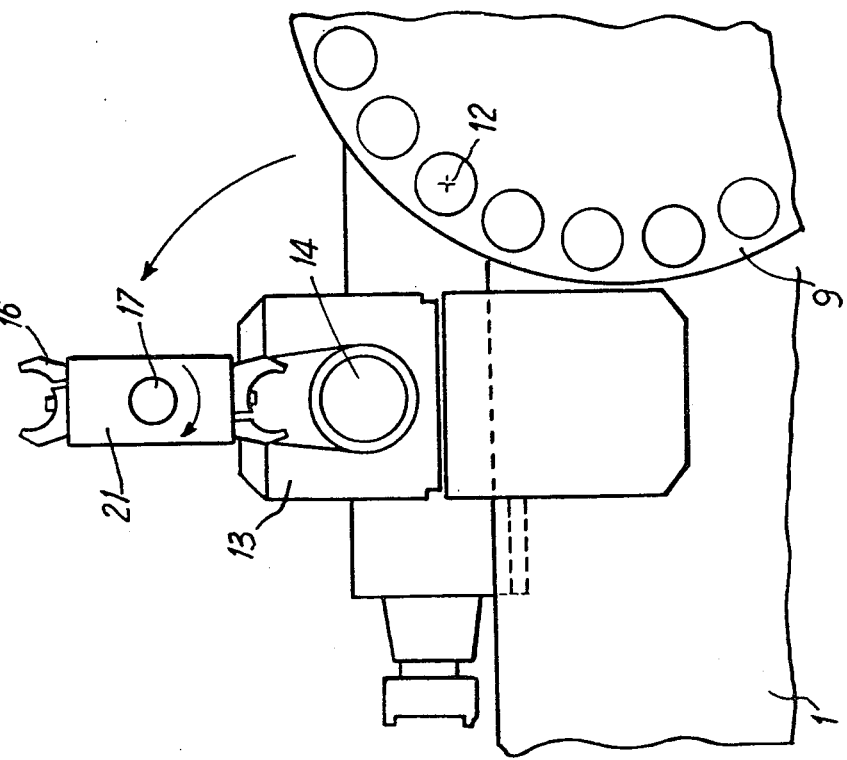

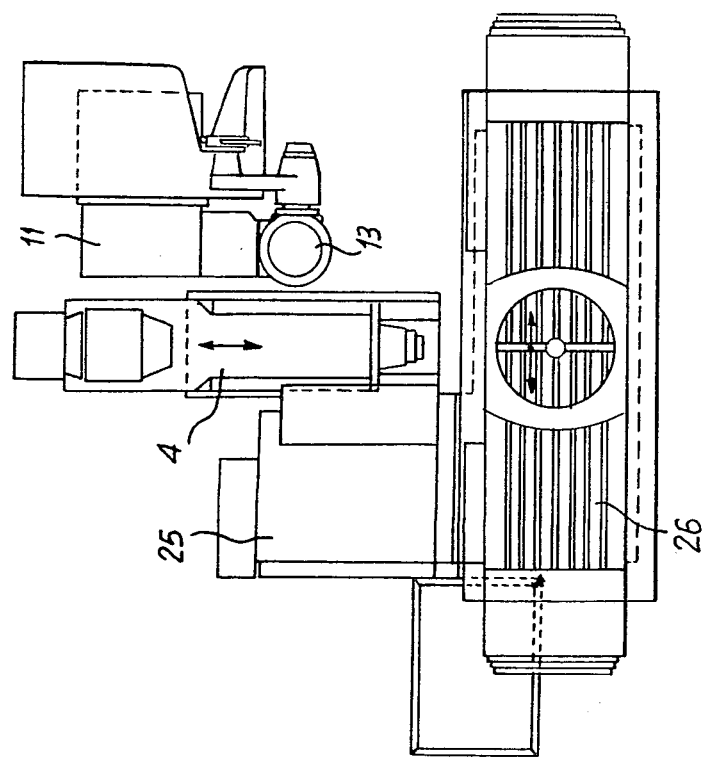
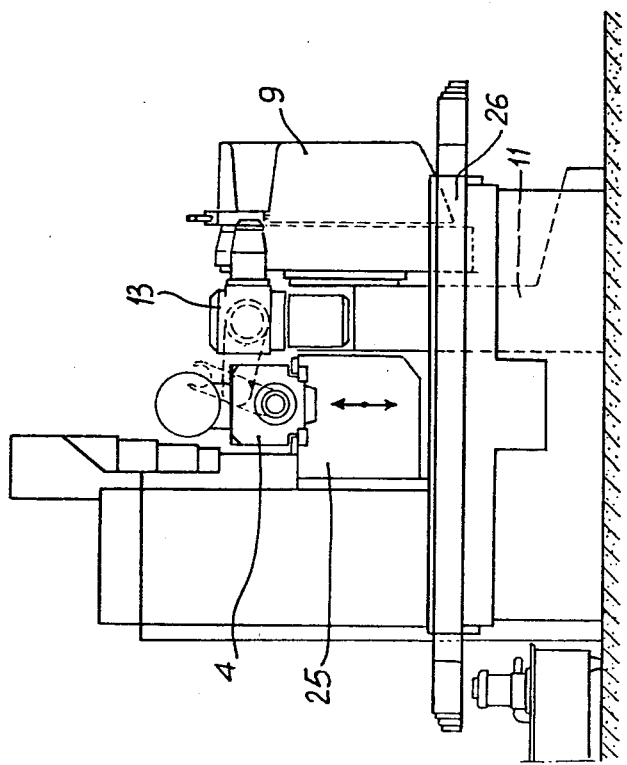

TOOL EXCHANGE APPARATUS FOR BORING MILLS AND METHOD FOR EXCHANGING TOOLS

BACKGROUND OF THE INVENTION

The present invention relates to a tool exchanger for boring mills of the type having a spindle carriage horizontally slidable on a support which is either solid with the frame or part of a movable console on a frame which can itself be moved along the axis of the spindle of the carriage or perpendicular to this axis.

From French Pat. No. 1,236,668 in particular, it is well known to extract and insert machine tools from a tool magazine in which the tools are disposed horizontally and parallel to the axis of a spindle by use of a rotary pincer-arm which permits exchange between the tool mounted on the spindle and a tool disposed in the magazine by combining motions of 180° rotation and translation. In other machines, the magazine is disposed perpendicularly to the axis of the spindle and the axis of the pincer-arm is situated 45° from both the axis of the spindle and the axis of the magazine.

In practice, however, the solutions adopted either do not respond suitably to all types of machines, or have substantial drawbacks.

Thus, in the case of machines having sliding spindle carriages, the installation of the magazine on the carriage leads to variable loads on the carriage which interferes with the working precision of the machine.

Accordingly, it is an object of the present invention to embody a tool exchanger in which the magazine is not borne by the sliding carriage.

Also, in many tool exchange devices, the interference of their operation with the motion of moving parts such as table, console (bracket) or carriage requires limiting these movements. This requires reduction of the size of the pieces that can be worked on the machine, and reduction of the size of the tools that can be used.

Accordingly, it is another object of the present invention to provide a tool exchange apparatus which does not set such limitations on the table, console or carriage movement, or on the length of the tools that can be used and which is completely clear of the active parts of the machine during the idle position.

Another drawback of certain prior devices is that they prevent or diminish access to the machine. Accordingly, it is another object of the present invention to provide an apparatus which does not entrain an appreciable diminution in frontal or lateral access to the machine by the operators who are to use it.

In certain machines the magazine is situated above the machine at a height which is inaccessible or difficult for operators to reach. This constitutes a serious drawback, and the present invention envisages the embodiment of a device in which the magazine is easily accessible.

The magazine is conventionally placed above the machine to avoid interference of the path of the pincer-arm with the paths of the other members, or with the movements of the headstock or spindle-holding head, or with the guides of the sliding carriage. This problem is sometimes solved by having the pincer-arm withdraw tools from a position above the spindle. This leads to situating the magazine at some height.

Accordingly, it is another object of the present invention to provide an apparatus capable of withdrawing tools, and installing them on the spindle from above without having the magazine placed in a position that is inaccessible.

In many tool exchangers, the pincer-arm simultaneously withdraws a tool from the magazine and from the spindle and exchanges them in a 180° rotation. As a result, the withdrawn tool is arranged in the magazine, not in a specific location, but in the position in the magazine from which the fresh tool was taken. This means that programming of tool changes is much more complicated since the tools do not have established places in the magazine. In particular, if the same tool is to be used several times in the course of consecutive operations, marking of the position in the magazine where it is placed raises problems.

In the tool exchanger of the present invention this problem is solved since a given tool can easily be replaced in a given position on the magazine.

The use of pincer-arms which effect tool exchange by a simple 180° rotation with the pincer-arm simultaneously displacing the extracted tool and the tool to be installed requires a relatively low density of tools in the magazine. Such pincer-arms carry lateral pincers whose path sweeps a wide area, and it is necessary, therefore, to provide a certain minimum spacing between the tools in the magazine. However, the tool exchanger of the present invention lacks this drawback.

Furthermore, an important requirement is saving time during the tool exchange. In many machines, the tool exchange cannot take place until the headstock or spindle-bearing head is in a given position. The time required to bring the spindle to the appropriate position represents an expenditure of time. In addition, time is required for the successive rotation and translation of the pincer-arm.

Accordingly, it is another object of the present invention to provide an apparatus wherein the pincer-arm can execute a series of preparatory composite movements while the machine is still in operation so as to considerably reduce the time necessary for the tool exchange.

BRIEF SUMMARY OF THE INVENTION

These and other objectives are achieved by the present invention which envisages a tool exchanger apparatus for a boring mill of the type having a spindle carriage sliding on a support which is fixed or movable relative to the frame of the milling cutter which can itself be movable. The tools are disposed in a magazine so as to appear horizontally at the exchange station, and the transfer of tool is effected by a rotating pincer-arm bearing two pincers symmetrical to its axis. The pincer-arm is mounted rotatably on one of two parallel horizontal axes of the crank, which is rotatable and can slide along its other axis in a rotary head which is itself rotatable around a vertical axis that is fixed relative to the magazine. The magazine and the support of the rotary head have fixed relative positions. The assembly of magazine and support of the rotary head are fixed relative to the vertical plane of the spindle axis, even when this plane is capable of displacements relative to the ground, particularly in the case of movable frame machines.

The tool exchange occurs at a predetermined position of the carriage, both along its axis and in height. This position is not necessarily fixed relative to the ground, particularly in the case of movable frame machines, but it is fixed in the plane of the spindle axis and in every case the position of the tool exchanger plus rotary head support assembly is fixed relative to the position occupied by the carriage when the latter is in the position selected for the tool exchange.

For milling cutters having a frame movable perpendicular with respect to the axis of the spindle, the magazine plus rotary head support assembly will be mounted on the movable frame.

For milling cutters with frame movable parallel to the axis of the spindle, the magazine and the rotary head support assembly can be mounted directly on the ground.

For milling cutters in which the carriage slides on a frame fixed to the ground, the magazine plus the rotary head support assembly can be mounted on the frame or on the ground.

An example of milling cutters to which the invention applies are the machines sold throughout the world under the trademark HURON. Among these machines, those of the so-called M type have a spindle carriage sliding on horizontal guides carried by a fixed frame. The fixed frame has vertical guides on which a console slides, and the console, in turn, bears horizontal guides on which the table, designed to receive the workpiece, can slide.

In P type HURON machines, the spindle carriage is mounted to slide horizontally on a console that slides vertically on a frame. The table which is designed to receive the workpiece, is fixed in height and slides longitudinally on a fixed frame.

In L type HURON machine, the spindle carriage is mounted to slide on a console that slides vertically on a frame which can slide longitudinally in front of a fixed bench.

In the tool exchange apparatus according to the present invention, the various elements are combined and coordinated so that, from a first stand-by position, the pincer-arm picks up a tool in a predetermined emplacement of the exchanger, hereinafter the exchange station. The pincer-arm then moves bringing it into a second stand-by position in which the axis of the pincer-arm is parallel to the spindle axis. Then, when the carriage arrives in a tool exchange position, the pincer-arm seizes and extracts the tool from the spindle and installs a new tool. The pincer arm then returns to a stand-by position. The pincer arm then places the tool in the magazine and returns to its original position.

During rotation of the crank which bears the pincer arm, the pincer arm also rotates proportionally. The combined rotation of crank and pincer-arm is such that the pincers which are situated on the terminal edges of the pincer arm, traverse a quasi-rectilinear final path directed at the axis of the spindle or of the exchange station. Furthermore, means are provided so that the pincer arm can rotate 180 about its axis independently of the rotation of the crank.

BRIEF DESCRIPTION OF THE DRAWINGS

Other objects and advantages of the present invention will become more apparent upon reference to the accompanying specification and annexed drawings in which:

FIG. 1 is a schematic frontal representation of a HURON type M milling cutter with mobile carriage on a fixed frame, equipped with the tool exchange apparatus according to the invention.

FIG. 2 is a side view of the machine in FIG. 1.

The following figures illustrate the movements and positions of the tool exchange apparatus of FIGS. 1 and 2, and more particularly:

FIGS. 3A and 3B are partial front and side views of the starting position or stand-by position between two tool exchanges.

Figure 4A:
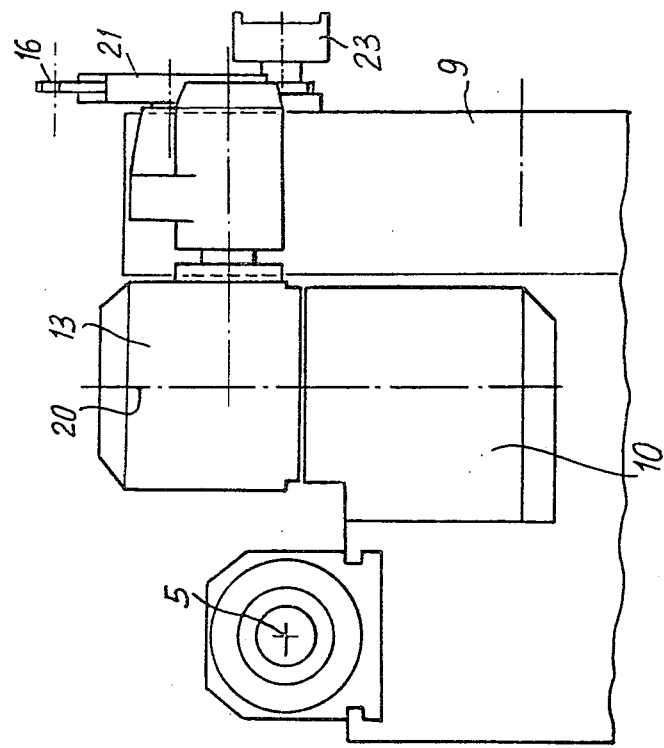
Figure 4B:
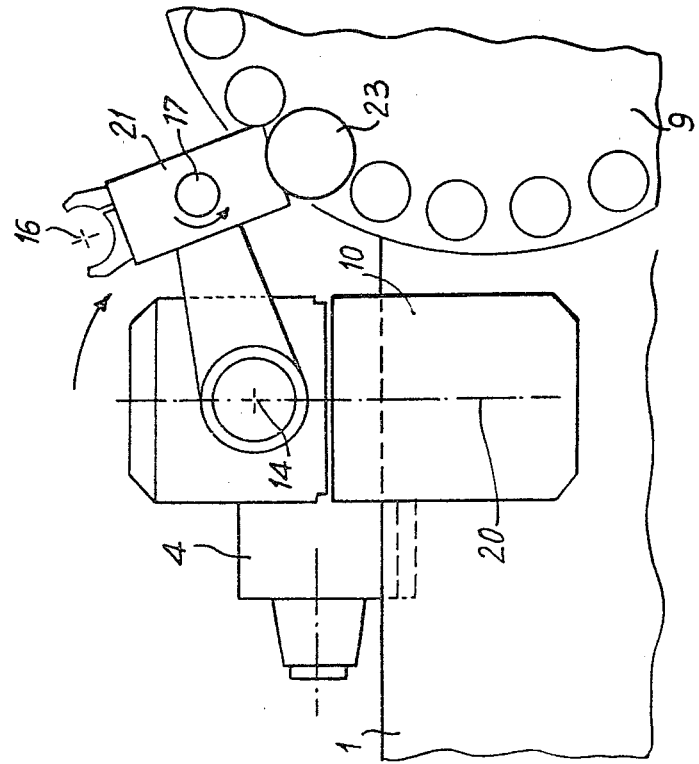

FIGS. 4A and 4B are front and side views of the position of the apparatus after rotation of the magazine to bring the selected tool to the exchange station, and combined rotation of the crank and pincer arm with seizure of the tool in the magazine.

FIGS. 5A and 5B are front and side views of the position of the apparatus after translation along the pivoting axis of the crank in the rotary head.

Figure 6A:
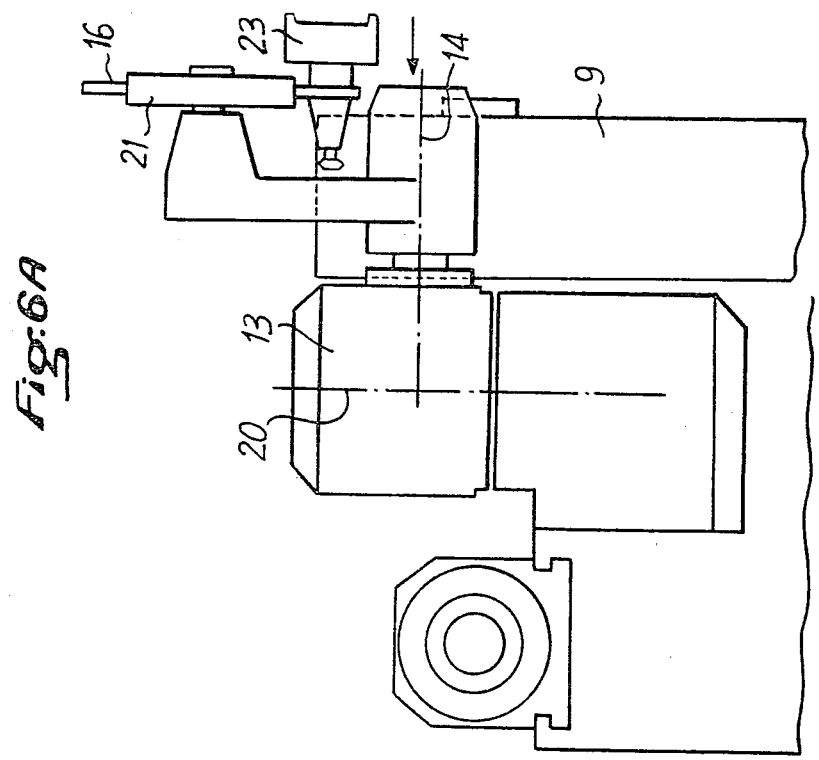
Figure 6B:
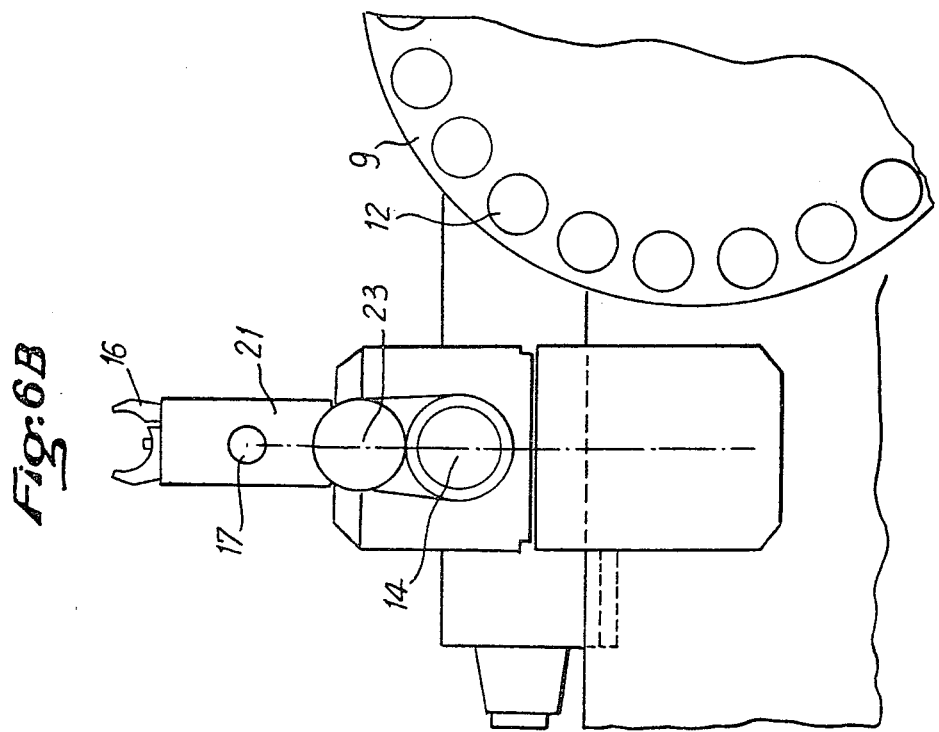

FIGS. 6A and 6B are similar views after return to the first stand-by position.

FIGS. 7A and 7B are similar views showing the position of the apparatus after rotation of 90° about the axis of the rotary head.

Figure 8A:
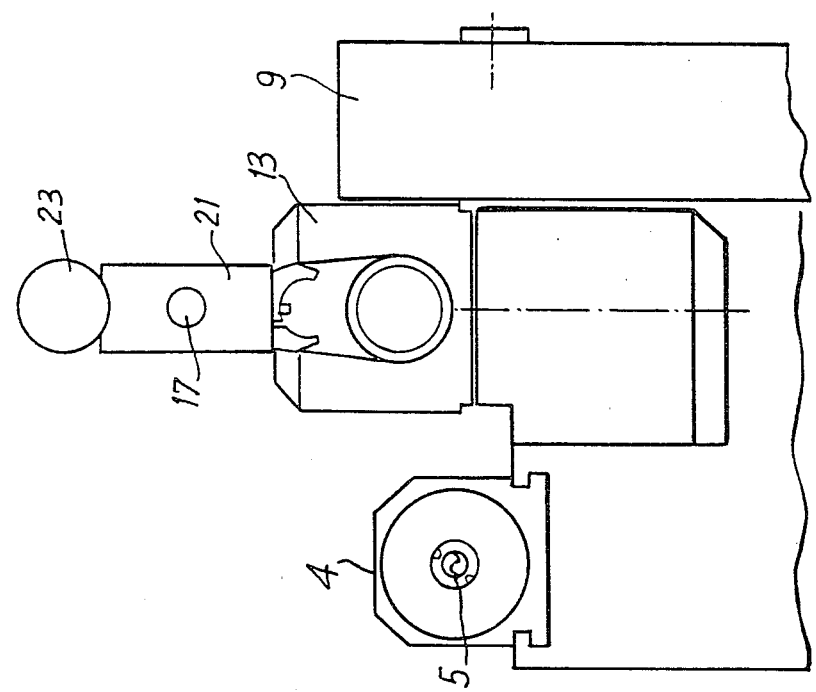
Figure 8B:
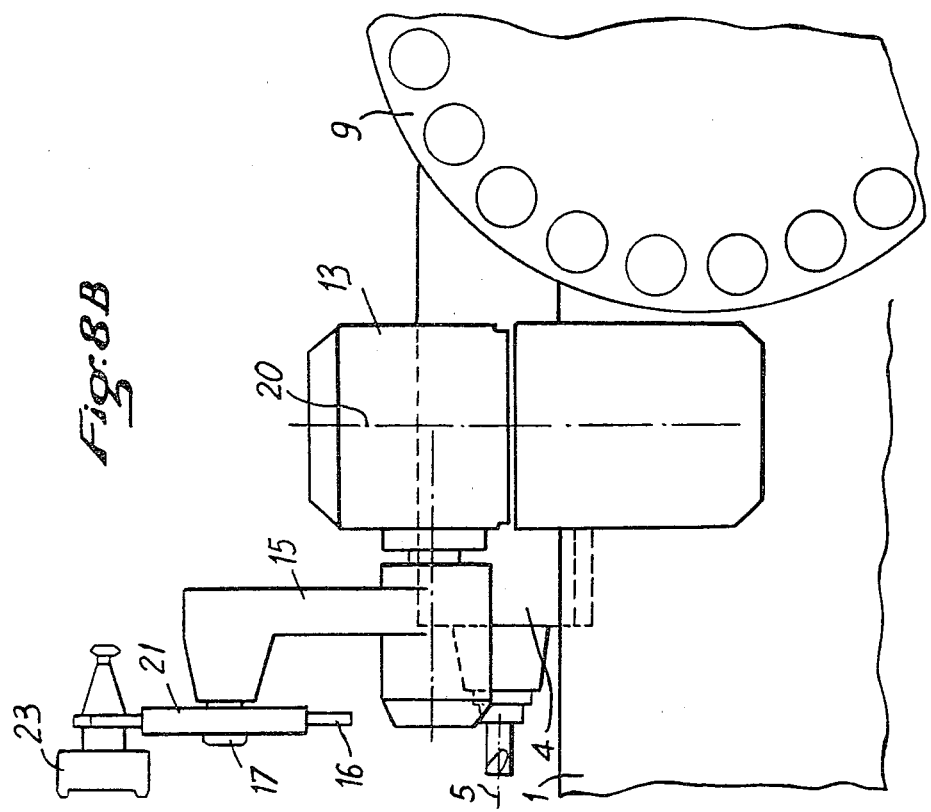

FIGS. 8A and 8B are similar views showing the so-called second stand-by position.

FIGS. 9A and 9B are similar views showing the position of tool seizure in the spindle.

FIGS. 10A and 10B are similar views after translation along the lower axis of the crank and extraction of the tool from the spindle.

Figure 11A:
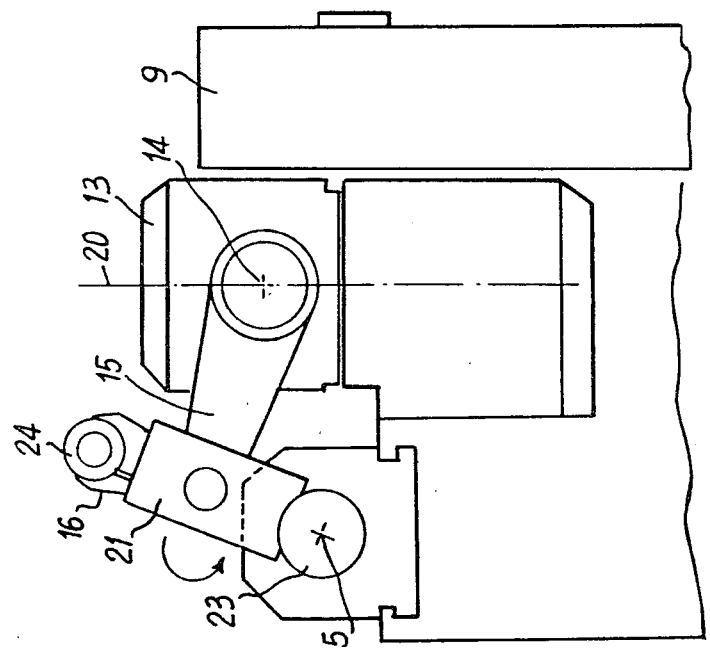
Figure 11B:
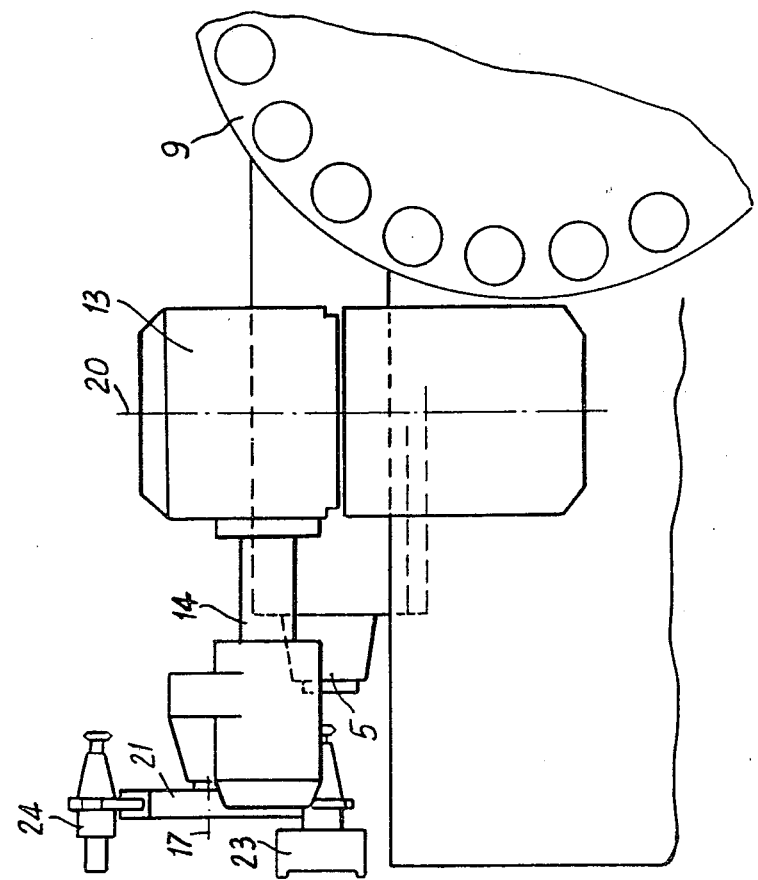

FIGS. 11A and 11B are similar views after 180° rotation of the pincer arm to present the tool.

FIGS. 12A and 12B are similar views after translation along the lower axis of the crank to fit the new tool in the spindle.

Figure 13A:
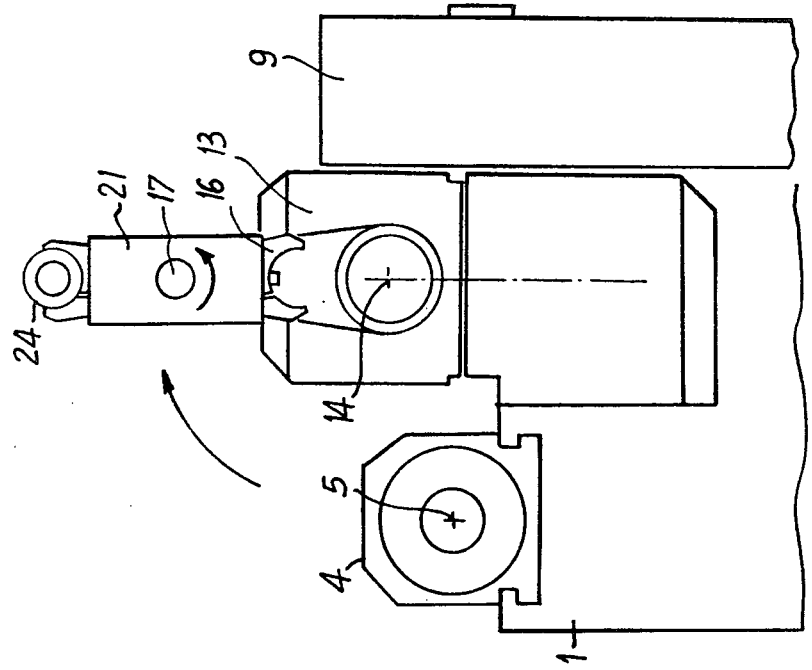
Figure 13B:
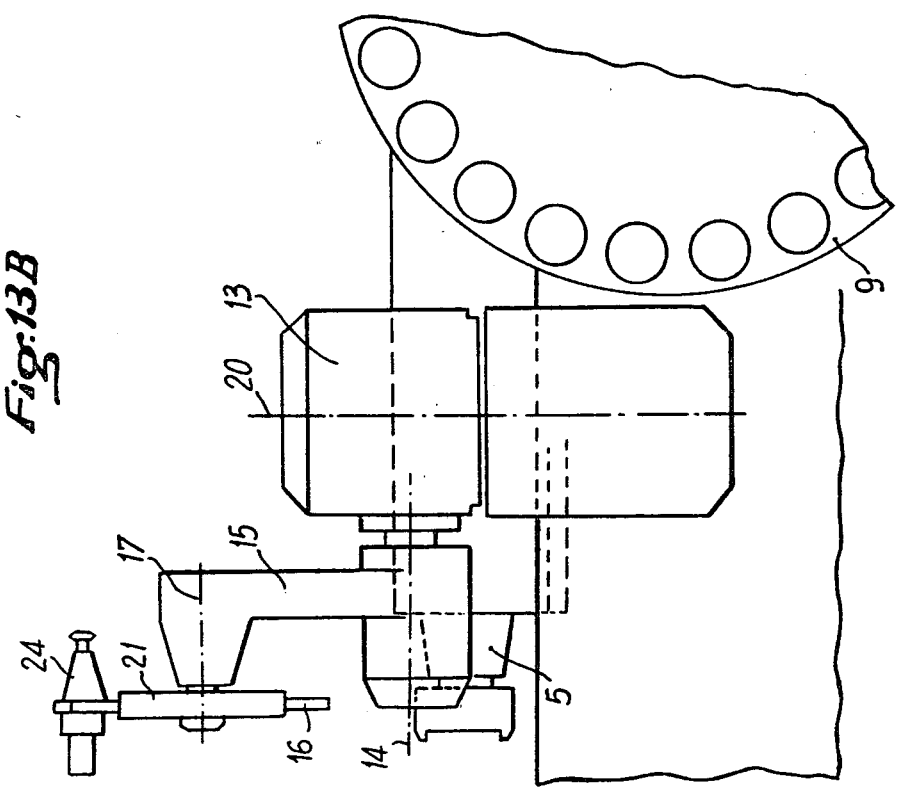

FIGS. 13A and 13B are similar views after combined rotation of the axes of the pincer arm and the crank to the second stand-by position.

FIGS. 14A and 14B are similar views after 180° rotation of the pincer arm.

FIGS. 15A and 15B are similar views after 90° rotation of the rotary head and translation along the lower axis of the crank.

FIGS. 16A and 16B are similar views after combined rotation of the pincer arm and the crank showing the tool in front of the exchange station of the magazine, which has, in the interim, rotated to present the appropriate cell to the exchange station.

FIGS. 17A and 17B are similar views after translation of the crank to place the tool in the magazine, and combined rotation of the pincer arm and crank to return to the first stand-by position.

Figure 18:
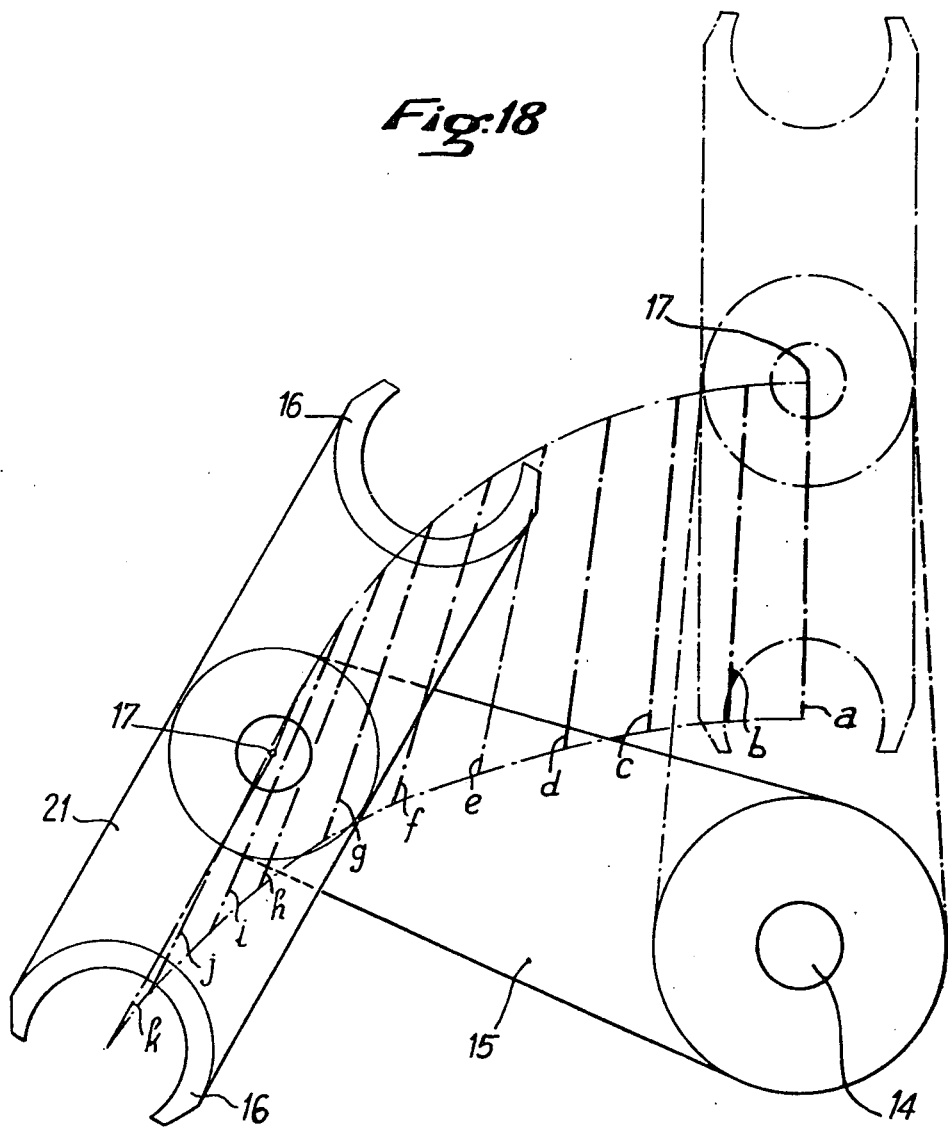

FIG. 18 is a diagram illustrating the combined rotation of the pincer arm and the crank, and the terminal portion of the pincer arm's path.

FIGS. 19 and 20 illustrate in frontal and overhead view, adaptation of the tool exchange apparatus to a machine having a carriage mounted on a console which can be moved vertically in front of a table which is fixed vertically and longitudinally movable, a HURON type P machine.

Figure 21:
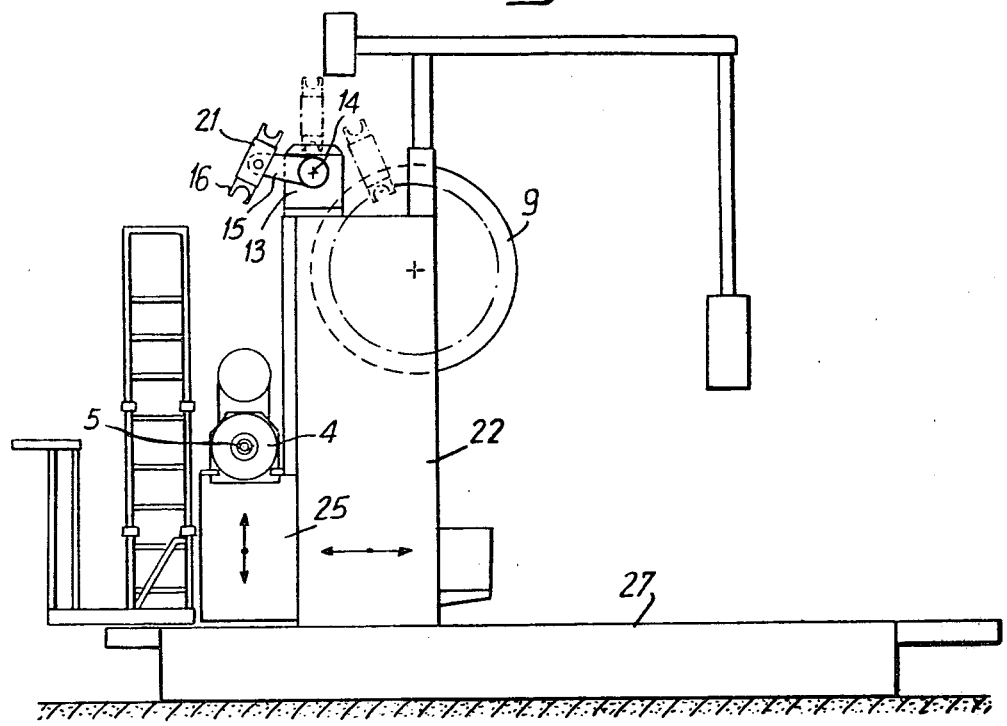
Figure 22:
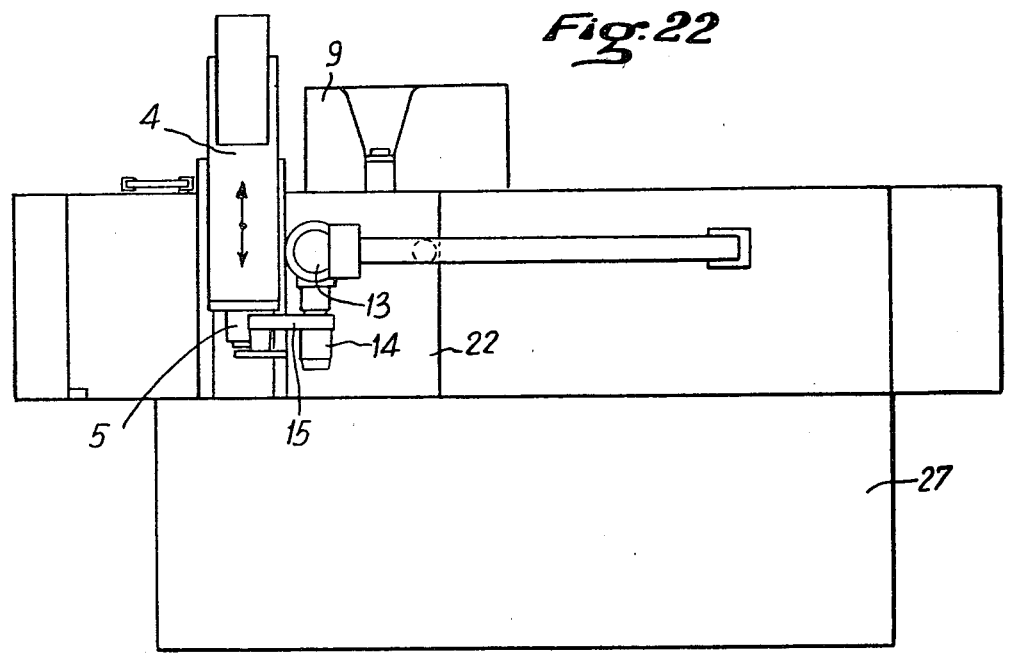

FIGS. 21 and 22 illustrate, in frontal and overhead view, adaption of the tool exchange apparatus to a machine having a carriage mounted on a console which can be moved vertically on a frame which can be moved longitudinally in front of a fixed bench; a HURON type L machine.

Figure 24:
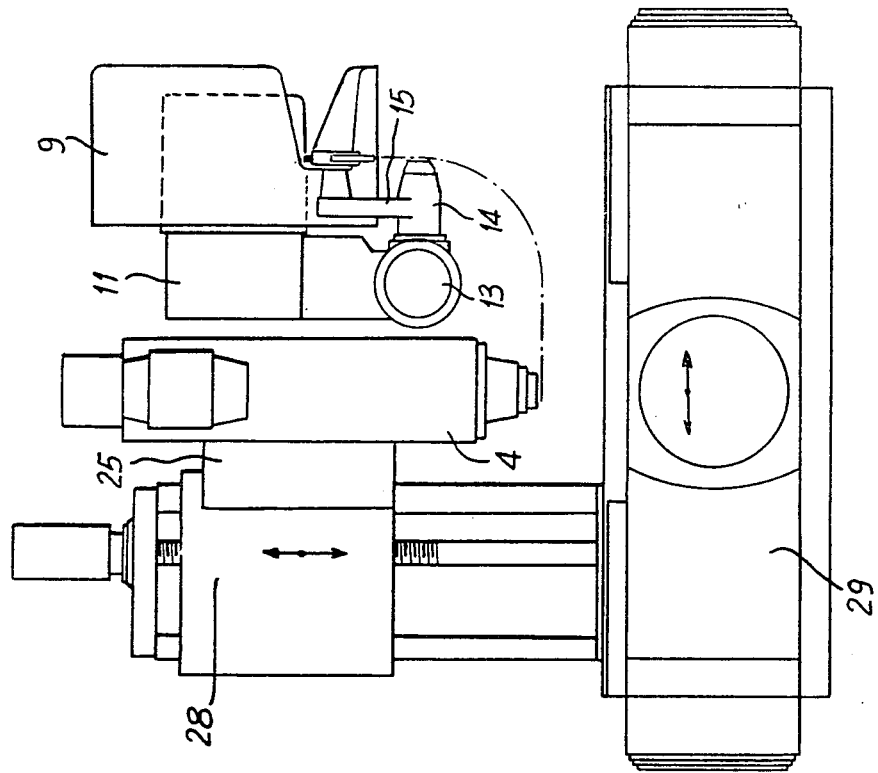
Figure 23:
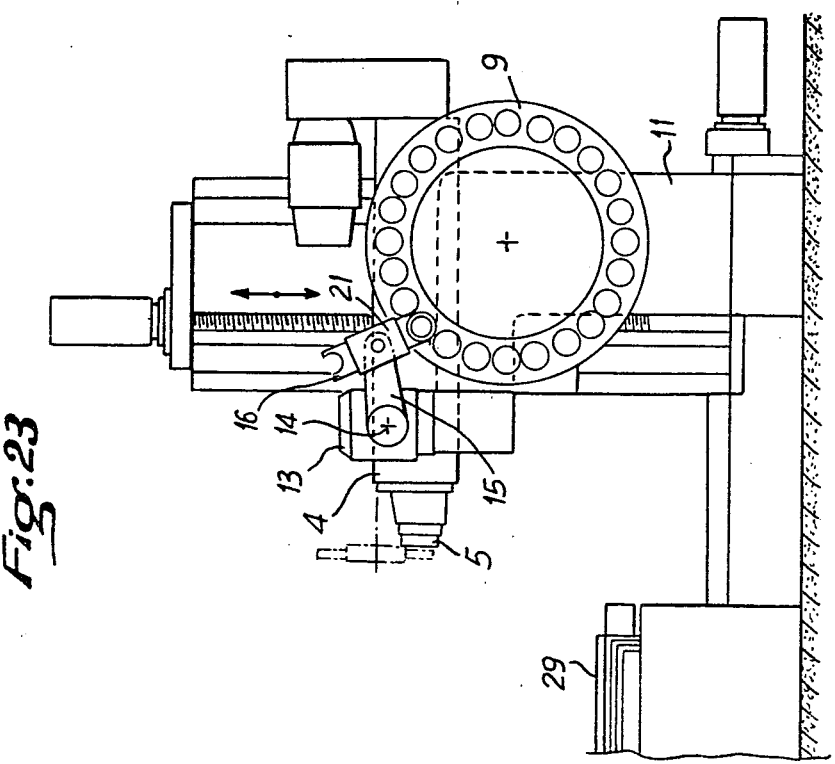

FIGS. 23 and 24 illustrate, in frontal and overhead view, adaption of the tool exchange apparatus to a machine having a carriage mounted on a console which is movable on a frame. The frame can be moved parallel to the axis of the spindle in front of a fixed bench.

DETAILED DESCRIPTION OF A PREFERRED EMBODIMENT

Referring to FIGS. 1 and 2, it can be seen that the machine represented, which is a HURON type M machine, comprises a frame 1 fixed to the ground and having, at the front, vertical guides 2, and on top, horizontal guides 3. A carriage 4 bearing the horizontal spindle 5 slides on the horizontal guides 3. A console 6 having horizontal guides 7 at its top slides in vertical guides 2. A table 8 designed to receive the workpiece slides on guides 7. Table 8 slides horizontally from left to right and from right to left. Console 6 slides vertically downward and upward. Carriage 4 slides horizontally from front to rear and from rear to front. In the tool exchange position, carriage 4 stops at a predetermined position which permits clearance of the tang of the tool and of the tool locking device of spindle 5 without interference with the maximum available volume on table 8 of the machine; this position is, in practice, the position of maximum rearward withdrawal of the carriage. On the side of the machine are attached the tool magazine 9 and the tool exchange apparatus generally designated 18.

A base 11 is fixed to the ground or to the frame of the machine. Tool magazine 9 is mounted for rotation about a horizontal axis of base 11. Magazine 9 is provided with cells in which the stored tools are held by a mechanical locking mechanism.

Each cell has a particular mark which enables a detection device to identify it and to halt rotation of the magazine when the selected cell moves into the exchange station 12.

In an alternate embodiment, a circular coding device senses the orientation of the magazine and triggers rotation of magazine 9 so that the selected cell is presented to exchange station 12 for tool exchange.

In another alternate embodiment, a non-circular magazine is provided. A coding device senses the position of the magazine and triggers movement of the non-circular magazine so that the selected cell is presented to exchange station 12 for tool exchange.

A hydraulic locking device insures precise positioning of the cell at exchange station 12, and unlocks the mechanical device to permit extraction or introduction of a tool in the selected cell.

The loading or unloading of tools in the cells of the magazine is done manually at station 12 provided for tool exchange. It is also possible to provide for unlocking at other stations to facilitate loading and unloading of tools.

As shown in the figures, the magazine 9 is accessible at the side and at the rear of the machine.

In the preferred embodiment, magazine 9 is of circular form and rotatable on its axis. However, it should be evident that other forms can be adopted. In particular, an endless chain running on rollers and having any desired configuration can be used so long as the axis of the tool is horizontal at exchange station 12. The tool exchange apparatus comprises a support 10, fixed relative to magazine 9. Support 10 supports a head 13 which can pivot about a vertical axis 20. At its axis 14, crank 15 is rotatably and slidably mounted to head 13. Pincerarm 21, on the terminal faces of which pincers 16 are disposed, is mounted to crank 15 at its axis 14. The rotation of head 13 about its axis 20 and the crank 15 about its axis 14 and pincer arm 21 about its axis 17 is effected by any suitable conventional device, for example: revolving hydraulic cylinders such as shown in U.S. Pat. No. 3,616,526; hydraulic cylinders or jacks with rod and piston such as shown in U.S. Pat. No. 4,012,830; hydraulic motors; or electric motors. All of these devices are well known.

In the preferred embodiment, support 10 is fixed to the frame 1 of the machine. In an alternate embodiment, support 10 can be solid with magazine 9 as in FIGS. 19 and 20 and FIGS. 23 and 24. In an another embodiment, support 10 can be borne with magazine 9 by the movable frame as in FIGS. 21 and 22. In each case, support 10 is fixed in spatial relationship relative to magazine 9, and more specifically to exchange station 12.

Vertical axis 20 of rotary head 13 is equidistant from the axis of spindle 5 and from the axis of exchange station 12.

In the case of carriages 4 mounted on consoles which can be moved vertically (FIGS. 19 to 24), axis 20 is equidistant from the axis of spindle 5 in tool exchange position, and from the axis of the exchange station 12.

When carriage 4 is in tool exchange position, axis 20 will be equidistant from spindle 5 and from exchange station 12 and preferably both spindle 5 and exchange station 12 are at the same height above the ground, their positions resulting from rotation around axis 20.

The preferred position of magazine 9 and the assembly of head 13 and crank 15, depends on the types of machine used. In the case of a machine according to FIGS. 1 and 2, in which the axis of spindle 5 is fixed, the tool exchange position of the carriage will preferably be the position of maximum withdrawal and the magazine is preferably disposed laterally together with the rotary head. The machine is completely clear of obstructions both frontally and laterally.

In the case of a machine according to FIGS. 19 and 20, as well as FIGS. 23 and 24, the same is true, the height selected for the tool exchange position of the carriage is preferably a lower position.

In the case of the HURON type L lateral milling machine, schematized in FIGS. 21 and 22, magazine 9 and rotary head 13 are borne by a movable frame 22 with magazine 9 being to the rear of the frame and rotary head 13 on the top of the frame. In this machine, the preferred tool exchange position of the carriage is an upper position. There is full frontal and lateral accessibility.

The tool exchange is composed of a succession and a combination of movements of rotation of head 13, translation of crank 15, along axis 14 rotation of crank 15, and rotation of the pincer arm, which are described below with reference to FIGS. 3 to 18.

FIGS. 3A and 3B show the apparatus in starting position, also known as first stand-by position. This position occurs in the interim between two tool exchanges, or when no tool exchange is under way. The machine is schematized with carriage 4 in tool exchange position and with its spindle axis 5 sliding on support 1. Other parts of the machine are not represented for the sake of clarity. Axis 14 is parallel to the axis of magazine 9, crank 15 is in its upper position, and the pincer arm 21 is empty and vertical.

During a tool exchange, magazine 9 rotates to bring the selected tool into exchange station position 12. Crank 15 and arm 21 rotate to bring pincer 16 to the cell 12 so as to seize the tool by clamping of the pincer 16 onto the tool by any conventional means (FIGS. 4A and 4B).

In the preferred embodiment, crank 15 rotates about its axis 14 through approximately 75°, while pincer arm 21 rotates about its axis 17 through approximately 95°.

These two rotations preferably occur simultaneously so that during rotation of arm 15 around axis 14 a proportional rotation of arm 21 around axis 17 occurs. Rotation of both crank 15 and pincer 21 is controlled by any suitable conventional mechanism, for example, one such as shown in FIG. 7 of U.S. Pat. No. 3,616,626. This combination of movements causes pincer arm 21, in the zone of approach to position 12, or to spindle 5, to follow a path which is very close to translation along the axis of arm 21 and toward the axis of the tool to be grasped (see FIG. 18). FIG. 18 represents, in dotted lines, crank 15 and arm 21 in their starting position (position a). Various positions occupied by the axis of pincer 16 and the longitudinal axis of arm 21 are shown in the course of a combined rotation and seizure of a tool at station 12 (position b, c, d, ... k). It can be seen that at the end of the stroke (position h to k), the displacement of pincer arm 21 is approximately a translation along its axis.

This arrangement has a two-fold advantage. On the one hand it saves time during the tool exchange since the rotation of crank arm 15 and arm 21 can take place simultaneously rather than sequentially. In addition, since pincers 16 are located at the extreme edges of arm 21, the limited rotation of pincer arm 21 required to seize a tool minimizes the space necessary between two tools on magazine 9.

Crank 15 then translates along its axis 14 to arrive in the position shown in FIGS. 5A and 5B. In this position, tool 23 is extracted from magazine 9.

The assembly of crank 15 and arm 21 then rotate in reverse to return crank 15 to a vertical position and translate backwards along axis 14 to regain the first standby position, as shown in FIGS. 6A and 6B.

Next, head 13 rotates about its vertical axis 20 until the axis of the tool 23 is brought parallel to the axis of spindle 5 (FIGS. 7A and 7B). Then, or simultaneously, pincer-arm 21 rotates through approximately 180°, to bring it into the position shown in FIGS. 8A and 8B. It will be evident that these movements can be made while the machine is working and without interrupting the work. Thus, time is saved. The position shown in FIGS. 8A and 8B is the second stand-by position, in which the tool exchange apparatus waits for carriage 4 to be withdrawn into tool exchange position.

When carriage 4 is in tool exchange position, crank 15 rotates through approximately 75° and arm 21 rotates through approximately 95° to bring the empty pincer 16 into engagement on tool 24 which is held in spindle 5. The two rotations preferably occur as already described, for the same purposes and with the same advantages.

A translation of crank 15 along its axis 14 then causes extraction of tool 24 from spindle 5 (FIGS. 10A and 10B). Arm 21 then rotates through 180°, bringing tool 23 opposite spindle 5 (FIGS. 11A and 11B). A reverse translation of crank 15 along its axis 14 fits tool 23 in spindle 5 (FIGS. 12A and 12B).

A combined rotation, the reverse of the preceding one, of crank 15 and arm 21 returns the apparatus to the second stand-by position (FIGS. 13A and 13B) disengages carriage 4 and spindle 5, and permits the machine to resume working with no other interruption.

Then, arm 21 rotates through approximately 180°, placing tool 24 in the lower position (FIGS. 14A and 14B), and an approximately a 90° rotation of head 13 about axis 20 returns the apparatus to the first standby position. From this position, crank 15 undergoes a translation along its axis 14 (FIGS. 15A and 15B). Then a combined rotation of crank 15 and arm 21 brings the tool opposite station 12 of the magazine, which, in the meantime, has rotated to bring to station 12 the cell corresponding to tool 24 (FIGS. 16A and 16B).

A reverse translation of crank 15 returns tool 24 to the magazine. Crank 15 and arm 21 then simultaneously rotate in reverse to return the apparatus to its original position (FIGS. 17A and 17B).

As can be seen from the preceding description, rotation of crank 15 about its axis 14 causes (by any appropriate mechanism) a proportional rotation of pincer arm 21 about its axis 17.

The ratio of the angle of this combined rotation and the final angle of crank 15 are such that, on the approach to exchange station 12 or to spindle 5, arm 21 substantially translates along its longitudinal axis.

With the carriage 4 in tool exchange position, the position of vertical axis 20 of head 13 and the position of exchange station 12 of magazine 9 are such that the position of the tool in the spindle, and the position of the tool at exchange station 12 result from one another by rotation of head 13 about its axis 20.

Crank 15 is preferably of a length greater than the distance separating pincer 16 from axis 17 of pincer arm 21.

Pincer arm 21 can rotate approximately 180° about its axis 17 independently of the rotation of crank 15.

Crank 15 can slide in head 13 along its lower axis 14 and pincer arm 21 is mounted to the upper axis 17 of crank 15.

Crank 15 and arm 21 are substantially vertical in the stand-by positions.

Pincer arm 21 is mounted on crank 15 so that the horizontal distance between pincers 16 and crank 15 will be greater than the length of a tool tang.

The respective positions of axis 20, of magazine 9 and of the carriage in exchange position is selected so that the lengths of crank 15 and arm 21 will be as short as possible, in order to avoid movements of wide amplitude which would generate parasite accelerations. However, arm 21 must be of sufficient length so that the journal of axis 17 will not interfere with carriage 4.

The orientation of entrainment slots on the tools are retained during the tool transfer, operations by a spur 19 (FIG. 3B) fixed on each pincer 16, and by a spur (not shown) fixed on each cell of magazine 9. A mechanical device orients spindle 5 of the machine to allow orientation of spindle 5 with the entrainment slots on the tool.

The tools are held by pincers 16 during transfer between the spindle 5 of the machine and the tool magazine 9 by a groove cut in the tang of the tools on which the pincers 16 grip.

As the work cycle progresses, the following operations can take place.

(a) Automatic searching for the cell in tool magazine 9 which corresponds to the worked tool and its positioning at exchange station 12.

(b) Return of the worked tool to its cell at station 12 of magazine 9.

(c) Search for the cell corresponding to the tool to be selected and its positioning at station 12.

(d) Extraction of the tool to be selected from its cell in the magazine, and its transfer in stand-by position toward the working spindle 5 of the machine with axis 14 parallel to the axis of spindle 5 and arm 15 stopped in its middle position.

The apparatus of the present invention can be mounted on various milling machines having a horizontally sliding spindle carriage.

In an alternative embodiment (FIGS. 19 and 20), the support on which carriage 4 slides is not the fixed frame 1, but a console 25 sliding vertically on frame 1. The assembly is placed in front of a table 26 which slides longitudinally while remaining at constant height. In this embodiment, head 13 is mounted solid with magazine 9 on a base 11 fixed to the ground.

Another alternative embodiment is shown in FIGS. 21 and 22. In this embodiment, carriage 4 is mounted on a console 25 which can slide vertically on a frame 22. Frame 22 itself can translate longitudinally in front of fixed bench 27. In this embodiment head 13 is mounted on movable frame 22 with magazine 9. Magazine 9 is located so that the axes of the tools are parallel to the axis of spindle 5. Head 13 rotates between the two stand-by positions through approximately 180° instead of through approximately 90°. The tool exchange position of carriage 4 corresponds to an upper position of console 25 in contrast to the lower position shown in the embodiment of FIGS. 19 and 20.

Still another embodiment is shown in FIGS. 23 and 24 in which the tool exchange apparatus is mounted on a machine in which carriage 4 slides on a console 25. Console 25 in turn slides vertically on a frame 28 which is movable parallel to the axis of spindle 5. The entire machine is placed in front of a table 29 which can move longitudinally or transversely to the spindle axis. The assembly of head 13 and magazine 9 is mounted on a base 11 which is fixed to the ground.

It will be apparent to those having ordinary skill in the art that the present invention may take a variety of forms, that the preceding description is merely illustrative and that the scope of protection afforded this invention is to be determined by the appended claims.

What is claimed is:

1. In an improved apparatus for exchanging tools on milling machines of the type having a spindle carriage horizontally slidable on a support which is mounted to a frame, a spindle mounted to said carriage, a magazine in which said tools are disposed said magazine having a tool exchange position and means for transferring said tools from said magazine to said spindle, said transfer means having a rotatable pincer arm and at least two pincers situated on the terminal edge of said pincer arm wherein the improvement comprises:
    a head rotatable about a vertical axis fixed relative to said magazine;
    a crank having first and second horizontal axes, said crank mounted to said head for rotation about said first horizontal axis and for translation along said first horizontal axis;
    said pincer arm mounted to said crank for rotation about said second horizontal axis, and said magazine presenting said tool to an exchange station in horizontal orientation.

2. The apparatus according to claim 1 wherein said head is mounted on a support in fixed position relative to said magazine, said magazine and said support being in fixed position relative to the vertical plane of the axis of said spindle.

3. The apparatus according to claim 2 further comprising means for imparting to the carriage a tool exchange position which has predetermined axial position and height.

4. The apparatus according to claim 3 further comprising means for providing first and second stand-by positions, said first position having the axis of said pincer arm parallel to the axis of an exchange station of said magazine, said second position having said pincer arm axis parallel to the spindle axis.

5. The apparatus according to claim 4 wherein said crank and said pincer arm are substantially vertical during said first and second stand-by positions, said pincer arm being above said first horizontal axis of said crank.

6. The apparatus according to claim 4 wherein said exchange station of said magazine and the tool exchange position of said spindle are equidistant from the vertical axis of said rotary head.

7. The apparatus according to claim 4 further comprising means for engaging said pincer arm from said first stand-by position onto a tool at the exchange station of said magazine, means for extracting said tool by translation along said first horizontal axis of said crank, means for bringing said pincer arm into said second stand-by position with approximately 180° rotation of said pincer arm, means for seizing and extracting said tool from the spindle when said carriage has arrived in tool exchange position, means for rotating and emplacing a new tool in said spindle, means for returning to the second stand-by position, means for returning the to first stand-by position and means for placing the tool at the exchange station of said magazine and means for returning to the initial stand-by position.

8. The apparatus according to claim 3 further comprising means for proportionally linking the rotation of said crank with the rotation of said pincer arm.

9. The apparatus according to claim 3 wherein said pincer arm rotates about said second axis of said crank independently of the rotation and translation of said crank about and along said first axis of said crank.

10. The apparatus according to claim 8, wherein the combined rotation of said crank and of said pincer arm is such that on approaching the tool to be seized, the displacement of said pincer arm is approximately a translation along the longitudinal axis of said pincer arm which is directed to the axis of the tool to be seized.

11. The apparatus according to claim 1 wherein said crank is longer than the distance separating said pincer from the second horizontal axis of said pincer arm.

12. The apparatus according to claim 1 wherein said pincer arm is mounted on said crank so that the distance between said pincers and said crank is greater than the length of the tang of said tool.

13. The apparatus according to claim 1 wherein said crank and said pincer arm are of the minimum length necessary for execution of their movements without interference with said carriage.

14. The apparatus according to claim 1 further comprising a spur fixed on said pincer and a corresponding spur on each cell of said magazine said spur retaining the orientation of the entrainment slots of said tools during the exchange of tools.

15. In a method for exchanging tools from the exchange station of a magazine to a spindle comprising the steps of:
    engaging an assembly of crank and pincer arm mounted on a rotary head from a first stand-by position in which the axis of said pincer arm is parallel to said exchange station onto a first tool at an exchange station of said magazine by simultaneously rotating said crank and said arm so that on approaching the tool to be seized, the displacement of said pincer arm is approximately a translation along the longitudinal axis of said pincer arm extracting said first tool by translating said crank along a first horizontal axis of said crank;

rotating said head about a vertical axis to bring said assembly into a second stand-by position in which the axis of said pincer arm is parallel to the axis of said spindle;

rotating said pincer arm;

engaging said assembly onto a second tool at the spindle axis;

extracting said second tool by translating said crank along said first horizontal axis of said crank; and inserting said first tool onto said spindle.

* * * * *